(12) United States Patent
Yagi

(10) Patent No.: US 7,462,856 B2
(45) Date of Patent: Dec. 9, 2008

(54) SCANNING SYSTEM

(75) Inventor: Keiichi Yagi, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/087,573

(22) Filed: Mar. 24, 2005

(65) Prior Publication Data

US 2005/0211877 A1  Sep. 29, 2005

(30) Foreign Application Priority Data

Mar. 25, 2004  (JP) .............................. 2004-089269

(51) Int. Cl.
*G03B 42/02* (2006.01)
(52) U.S. Cl. .................................................... 250/584
(58) Field of Classification Search ................ 250/585, 250/370.09, 584
See application file for complete search history.

(56) References Cited

U.S. PATENT DOCUMENTS 6,268,614 B1   7/2001   Imai 6,310,358 B1 * 10/2001 Zur ............................ 250/591
2001/0045536 A1 * 11/2001 Shoji ......................... 250/591

FOREIGN PATENT DOCUMENTS

JP  2001228561 A  *  8/2001

* cited by examiner

Primary Examiner—David P Porta
Assistant Examiner—Marcus H Taningco
(74) Attorney, Agent, or Firm—Sughrue Mion, PLLC

(57) ABSTRACT

A scanning system causes a reading light beam to scan a radiation image recording medium which records a radiation image thereon upon exposure to radiation carrying thereon the radiation image and from which a signal is read out according to the radiation image upon exposure to the reading light beam. A mobile body provided with a light source which emits a line-like reading light beam. A driver linearly moves the mobile body in a direction perpendicular to the longitudinal direction of the reading light beam and a holder holds the mobile body in a predetermined position.

5 Claims, 4 Drawing Sheets

SCANNING SYSTEM

BACKGROUND OF THE INVENTION

1. Field of the Invention

This invention relates to a scanning system where a movable body with a light source for projecting reading light is linearly moved to cause the reading light to scan the radiation image recording medium.

2. Description of the Related Art

There have been proposed and put into practice, for instance, in the medical field various radiation image recording media which are irradiated by radiation passing through an object and stores therein a radiation image of the object.

As such a radiation image recording medium, there has been known, for instance, a radiation image sensor using semiconductor material which generates electric charges upon projection of radiation and a stimulable phosphor sheet using stimulable phosphors which store radiation energy upon projection of radiation and emit evanescent light upon projection of reading light.

When a radiation image is read out from such a radiation image recording medium as an electric signal, a reading light source emitting a line-like reading light beam is employed and is moved in a direction substantially perpendicular to the longitudinal direction thereof to cause the line-like reading light beam to scan the radiation image recording medium in view of increasing the reading speed. (See U.S. Pat. No. 6,268,614.)

Recently, from the viewpoint of reduction of the overall size of the system, a system where both the radiation image recording medium and the scanning system for causing the reading light beam to scan the radiation image recording medium are accommodated in one cassette. By the use of such a cassette, after a radiation image is recorded in a radiation image recording apparatus, the radiation image can be immediately read, and it is possible to correct the radiation image taking conditions viewing the read out radiation image.

In the radiation image recording apparatus, the reading light source must be moved sometimes for scanning in a direction inclined to the horizontal when the cassette is inclined in various directions according to the image taking conditions as in mammography.

The scanning system built in the cassette causes the mobile body (or the reading light source) to wait in a predetermined waiting position for a time other than when the reading light beam is to scan the radiation image recording medium. When the mobile body must be moved in a direction including the vertical components, it is necessary to hold the mobile body in the waiting position by a drive means such as a linear motor. Accordingly, there has been a problem that the drive means consumes power even if the mobile body is waiting. The power consumption of the drive means is increased as the direction in which the mobile body is moved approaches the vertical.

Further, it is not preferred from the viewpoint of generation of heat to drive the drive means, such as the linear motor, for a long time.

SUMMARY OF THE INVENTION

In view of the foregoing observations and description, the primary object of the present invention is to provide a scanning system which can linearly move a mobile body provided with a light source which projects a reading light beam onto a radiation image recording medium to cause the reading light beam to scan the radiation image recording medium with the light source inclined to the horizontal with reduced power consumption of a drive means which drives the mobile body.

In accordance with the present invention, there is provided a scanning system which causes a reading light beam to scan a radiation image recording medium which records a radiation image thereon upon exposure to radiation carrying thereon the radiation image and from which a signal is read out according to the radiation image upon exposure to the reading light beam, wherein the improvement comprises a mobile body provided with a light source which emits a line-like reading light beam, a drive means which linearly moves the mobile body in a direction perpendicular to the longitudinal direction of the reading light beam and a holder means which holds the mobile body in a predetermined position.

The holder means may comprise an engagement means which engages the mobile body with a fixed portion to hold it in the predetermined position.

In accordance with the scanning system of the present invention, since the mobile body is held in the predetermined position by the holder means, load on the drive means can be reduced and the power consumption of the drive means while the mobile body is waiting, even if the mobile body is to be moved in a direction other than the horizontal.

DESCRIPTION OF THE PREFERRED EMBODIMENTS

Figure 1:
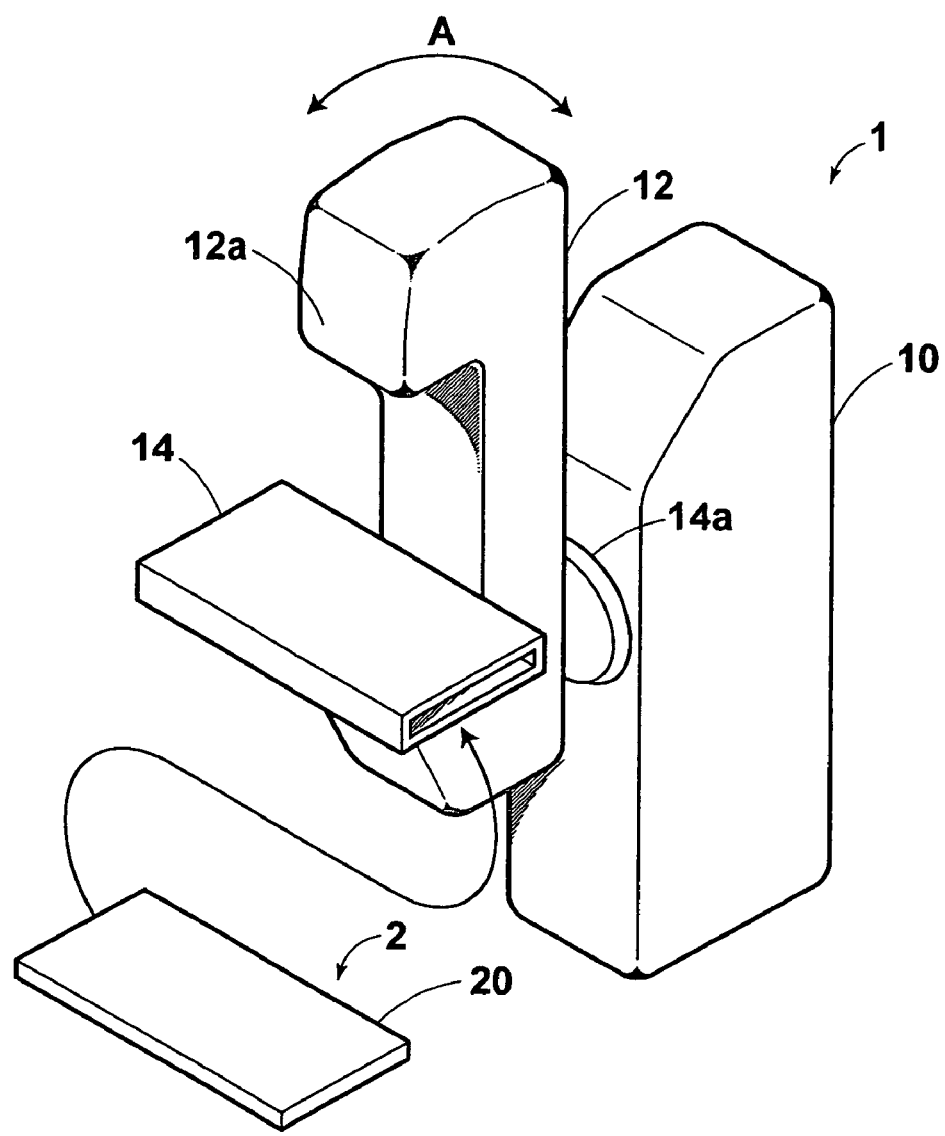
FIG. 1 is a schematic perspective view of a mammography system employing a scanning system in accordance with a first embodiment of the present invention.

In FIG. 1, a mammography system employing a scanning system in accordance with a first embodiment of the present invention comprises a system body 1 and a cassette 2 to be loaded in the system body 1.

The system body 1 comprises an image taking table 10, an arm portion 12 which is provided on the image taking table 10 and a cassette loading portion 14 which is provided on the arm portion 12.

The arm portion 12 rotates in the direction of arrow A about its junction 14a to the image taking table 10. Further, the arm portion 12 rotates the cassette loading portion 14 in the direction of arrow A. A radiation emitting portion 12a which is part of the arm portion 12 has a radiation source built therein. Radiation emitted from the radiation emitting portion 12a impinges upon the cassette loading portion 14 and a radiation image sensor 30 in the cassette 2 loaded in the cassette loading portion 14. Further, x-raying by the mammography system of this embodiment is carried out with an object positioned between the radiation emitting portion 12a and the cassette loading portion 14. The arm portion 12 is rotated depending on the purpose of x-raying, and an x-ray image is taken with the arm portion 12 inclined to various angles.

Figure 2:
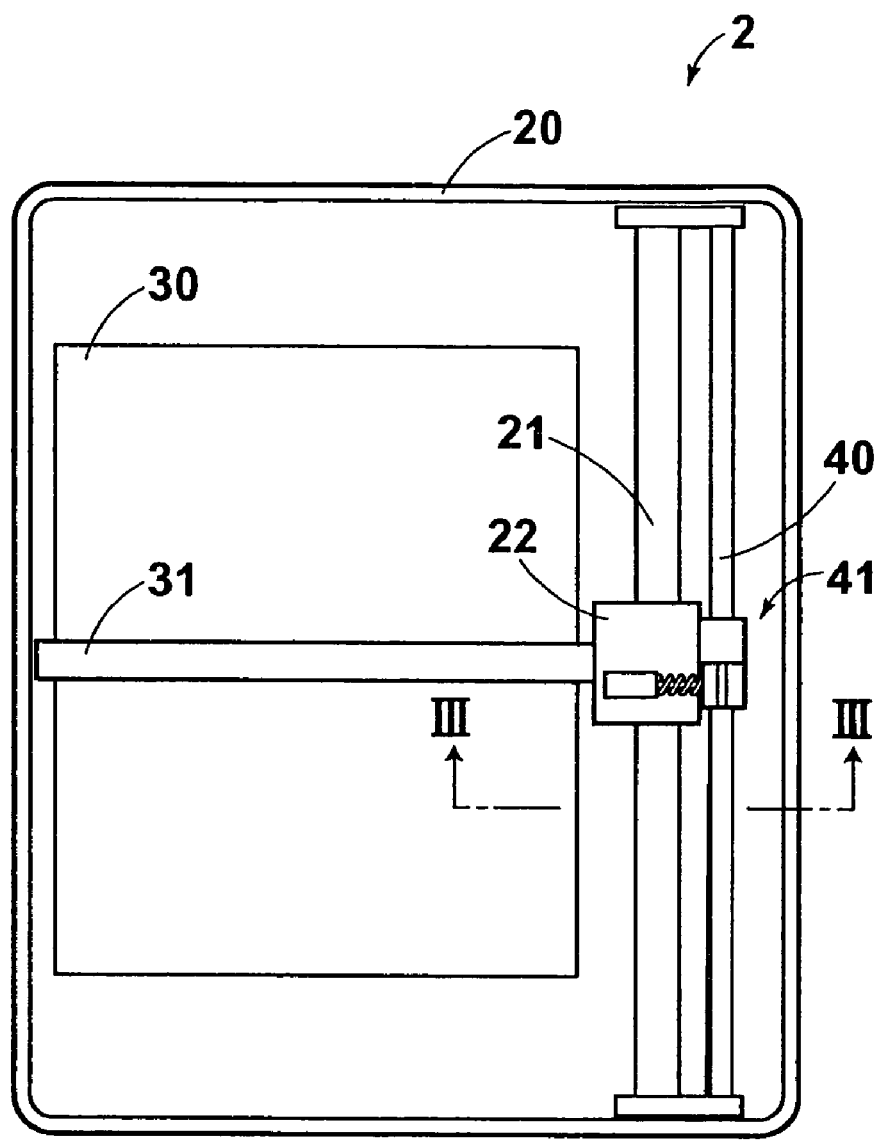
FIG. 2 is a schematic plan view of a cassette to be loaded in the cassette loading portion of the mammography system.
Figure 3:
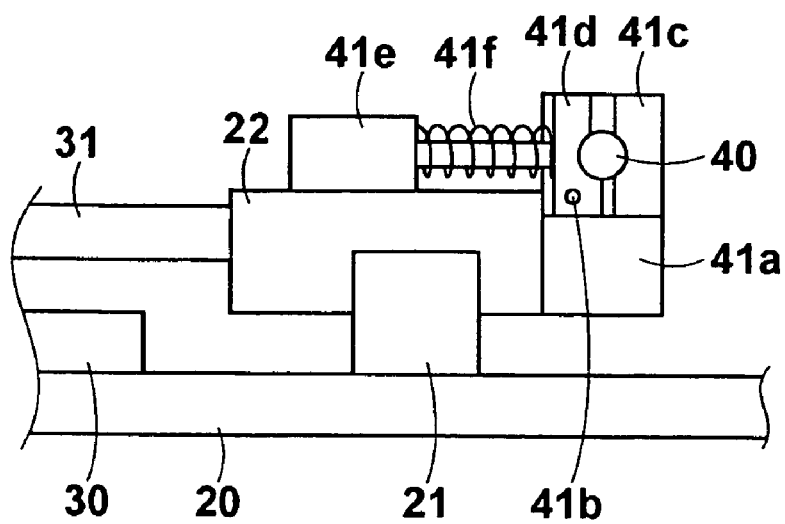
FIG. 3 is a cross-sectional view taken along line III-III in FIG. 2.

As shown in FIGS. 2 and 3, which are a plan view of the cassette 2 and a cross-sectional view taken along line III-III in FIG. 2, respectively, the cassette 2 comprises a casing 20 which transmits the radiation but cuts light, the radiation image sensor 30 installed in the casing 20, and a scanning system which linearly moves a mobile body provided with a reading light source 31 emitting a reading light beam to cause the reading light beam to scan the radiation image sensor 30.

The scanning system comprises a linear motor 21 as a drive means for driving the mobile body, a slider 22 which is linearly moved in the longitudinal direction of the linear motor 21, a shaft 40 as a fixed portion which is fixed to the casing 20 in parallel to the linear motor 21, a brake unit 41 as an engagement portion which is fixed to the slider 22 and is brought into engagement with the shaft 40 and a control means (not shown) which controls these elements, and the reading light source 31 is fixed to the slider 22 so that when the slider 22 is driven between an initial position (a waiting position on the side of one end of the linear motor 21) and an end portion (a waiting position on the side of the other end of the linear motor 21) by the linear motor 21, the reading light source 31 is moved substantially in parallel to the reading light scanning surface of the radiation image sensor 30 (up and down as seen in FIG. 2), thereby causing the reading light beam to scan the reading light scanning surface of the radiation image sensor 30.

In this particular embodiment, the slider 22, the reading light source 31 fixed to the slider 22, and the brake unit 41 form the mobile body, and the shaft 40 and the brake unit 41 form the holder means.

The brake unit 41 comprises a body 41a provided with a through hole through which the shaft 40 extends, a rotating shaft 41b and an engagement portion 41c which are fixed to the body 41a, and engagement portion 41d rotatable about the rotating shaft 41b, a solenoid 41e which moves the engagement portion 41d, and a spring 41f which urges the engagement portion 41d toward the shaft 40.

The solenoid 41e comprises a solenoid body provided with a winding and an iron core extending through the winding with the solenoid body fixed to the slider 22 and with one end of the iron core mounted on the engagement portion 41d.

In the brake unit 41, when the winding of the solenoid 41e is not energized, the engagement portion 41d is urged toward the shaft 40 under the force of the spring 41f so that the shaft 40 is sandwiched between the engagement portions 41c and 41d and a braking force acts, whereas when the winding of the solenoid 41e is energized, the iron core is moved away from the shaft 40 to disengage the engagement portion 41d from the shaft 40, whereby the braking force is released.

The reading light source 31, i.e., the mobile body is caused to wait in a predetermined waiting position near to the end of the scanning system except when the reading light beam is to scan the radiation image sensor 30. By holding the mobile body by the holder means when the mobile body is in the waiting position, the load on the linear motor 21 can be reduced and the power consumption of the linear motor 21 can be reduced while the mobile body is waiting, even if the mobile body is to be moved in a direction other than the horizontal.

Since the braking force acts when the solenoid 41e is not energized in the brake unit 41 of the holder means of this embodiment, additional electric power is not consumed while the mobile body is waiting.

Figure 4:
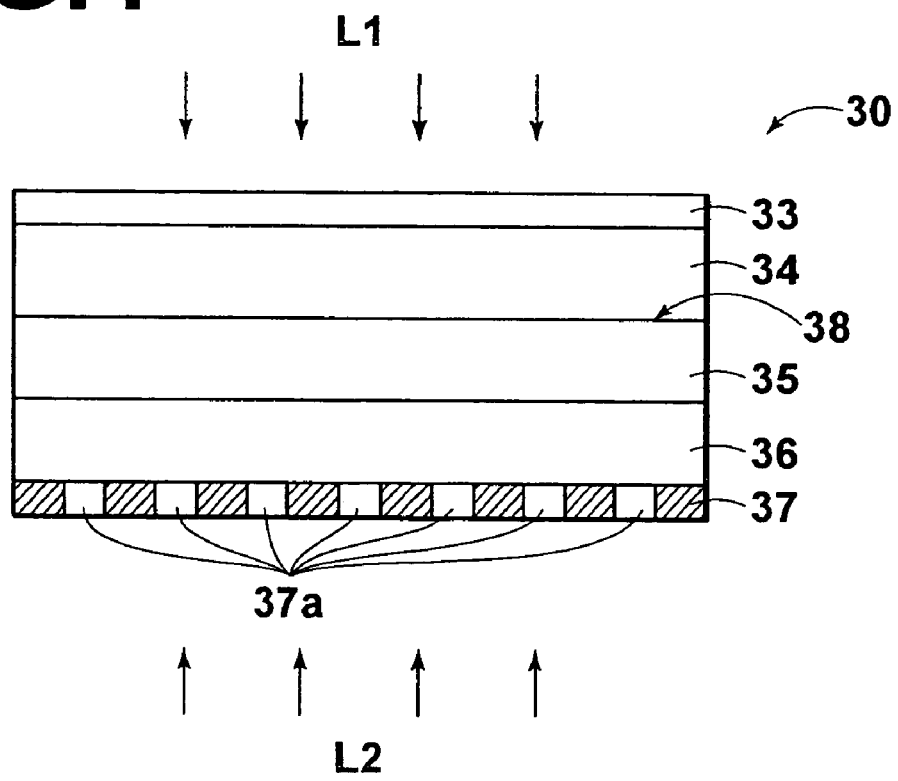
FIG. 4 is a schematic view showing a radiation image sensor which is provided in the cassette shown in FIG. 2.

As shown in FIG. 4, the radiation image sensor 30 comprises a first electrode layer 33 permeable to radiation L1 carrying thereon a radiation image, a recording photoconductive layer 34 which generates electric charges upon exposure to radiation passing through the first electrode layer 33, a charge transfer layer 35 which behaves like a substantially insulating material to the electric charges generated in the recording photoconductive layer 34 and behaves like a substantially conductive material to the electric charge in the polarity opposite to that of the electric charges generated in the recording photoconductive layer 34, a reading photoconductive layer 36 which generates electric charges upon exposure to reading light L2, and a second electrode layer 37 in which a plurality of linear electrodes 37a permeable to the reading light L2 are arranged in parallel to each other, the layers being superposed one on another in this order.

A radiation image is recorded on the radiation image sensor 30 when the radiation L1 is projected through the first electrode layer 33 and the latent-image charges generated according to the amount of the projected radiation L1 are accumulated in a charge accumulating portion 38 formed at the interface between the recording photoconductive layer 34 and the charge transfer layer 35. Further, the radiation image is read out as an electric signal when the reading light beam L2 is projected onto the radiation image sensor 30 through the linear electrodes 37a to impinge upon the reading photoconductive layer 36 and the charges in one polarity generated in the reading photoconductive layer 36 upon exposure to the reading light beam L2 are combined with the latent image charges on the charge accumulating portion 38, while the electric charges in the other polarity are detected by the current detecting amplifier (not shown) connected to the linear electrodes 37a.

The radiation image sensor 30 and the reading light source 31 are positioned so that their longitudinal directions are substantially in perpendicular to the longitudinal axis of the linear electrodes 37a of the radiation image sensor 30.

Operation of the mammography system of this embodiment will be described, hereinbelow.

The cassette 2 is first loaded in the cassette loading portion 14 of the system body 1. Then the arm portion 12 is rotated in the direction of arrow A to a predetermined position depending on the purpose of x-raying. Thereafter, radiation is emitted from the radiation emitting portion 12a with an object positioned between the radiation emitting portion 12a and the cassette loading portion 14 so that the radiation passing through the object impinges upon the radiation image sensor 30 in the cassette 12. Electric charges are generated in the recording photoconductive layer 34 of the radiation image sensor 30 according to the amount of the projected radiation as described above and are accumulated, whereby a radiation image of the object is recorded.

After the radiation image is recorded, the brake unit 41 is released and the linear motor 21 is driven by the control means (not shown), and the reading light source 31 is moved in a direction substantially parallel to the reading light scanning surface of the radiation image sensor 30 (up and down as seen in FIG. 2). At the same time, the reading light source 31 is driven to emit the reading light beam toward the radiation image sensor, whereby the reading light beam is caused to scan the reading light scanning surface of the radiation image sensor 30.

By scanning by the reading light beam, the radiation image in the radiation image sensor 30 is read out as an electric signal, and the reading light source 31 is stopped in the waiting position and the braking unit 41 is applied to keep the reading light source 31 or the mobile unit waiting in the waiting position when the reading light source 31 (the mobile body) reaches the end portion and the scanning of the radiation image sensor 30 is ended.

Figure 5:
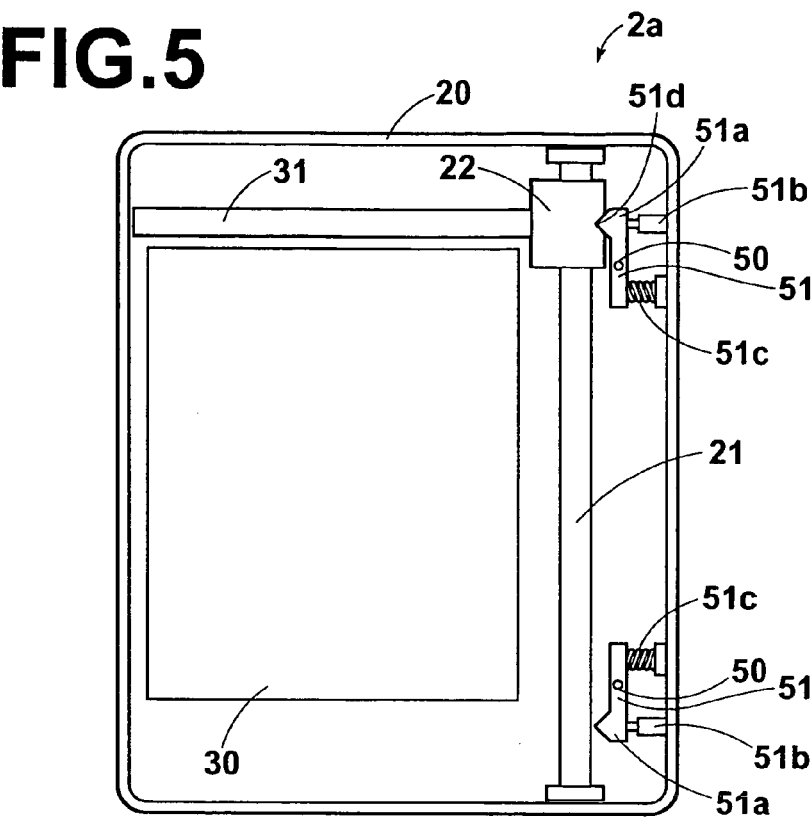
FIG. 5 is a schematic perspective view of a cassette of a mammography system employing a scanning system in accordance with a second embodiment of the present invention.

A second embodiment of the present invention will be described with reference to FIG. 5, hereinbelow. In FIG. 5, the elements analogous to those shown in FIG. 2 are given the same reference numerals, and will not be described here unless necessary. The scanning system of the second embodiment differs from that of the first embodiment in the form of the holder means.

The scanning system of this embodiment comprises a linear motor 21 as a drive means for driving the mobile body, a slider 22 which is linearly moved in the longitudinal direction of the linear motor 21, a rotating shaft 50 as a fixed portion which is fixed to the casing 20, an engagement means 51 which is brought into engagement with the rotating shaft 50 and a control means (not shown) which controls these elements, and the reading light source 31 is fixed to the slider 22 so that when the slider 22 is driven between an initial position (a waiting position on the side of one end of the linear motor 21) and an end portion (a waiting position on the side of the other end of the linear motor 21) by the linear motor 21, the reading light source 31 is moved substantially in parallel to the reading light scanning surface of the radiation image sensor 30 (up and down as seen in FIG. 5), thereby causing the reading light beam to scan the reading light scanning surface of the radiation image sensor 30.

In this particular embodiment, the slider 22 and the reading light source 31 fixed to the slider 22 form the mobile body, and the rotating shaft 50 and the engagement means 51 form the holder means.

The engagement means 51 comprises a body portion 51a which is held for rotation by the rotating shaft 50 and is provided with a projection on one end, a solenoid 51b which moves said one end of the body portion 51a toward the slider 22 when energized, a spring 51c which urges the other end of the body portion 51a toward the slider 22 and a recess 51d formed on the slider 22. The rotating shaft 50 and the body portion 51a, the solenoid 51b and the spring 51c of the engagement means 51 are provided symmetrically on opposite end portions of the linear motor 21 so that the mobile body is braked when it is in one of the waiting positions.

The engagement portion 51 is arranged so that when the solenoid 51b is not energized, the body portion 51a rotates clockwise under the force of the spring 51c so that the projection on the body portion 51a is disengaged from the recess 51d on the slider 22 to release the brake on the slider 22, whereas when the solenoid 51b is energized, the body portion 51a rotates counterclockwise so that the projection on the body portion 51a is engaged with the recess 51d on the slider 22 to apply the brake on the slider 22.

Also in this embodiment, by holding the mobile body by the holder means when the mobile body is in the waiting position, the load on the linear motor 21 can be reduced and the power consumption of the linear motor 21 can be reduced while the mobile body is waiting, even if the mobile body is to be moved in a direction other than the horizontal.

Figure 6:
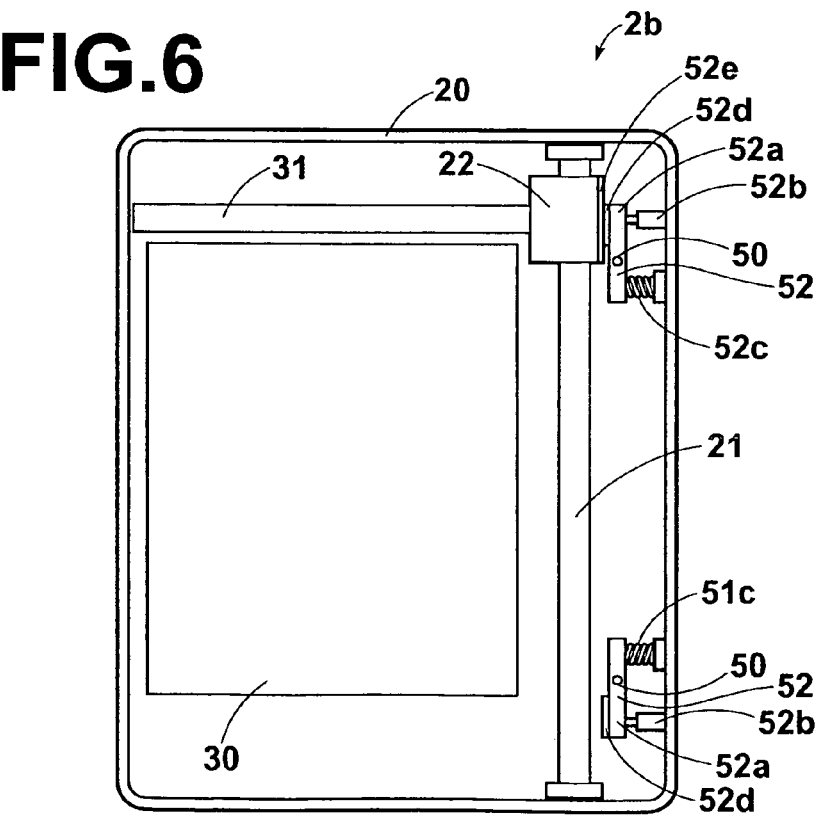
FIG. 6 is a schematic perspective view of a cassette of a mammography system employing a scanning system in accordance with a third embodiment of the present invention.

A third embodiment of the present invention will be described with reference to FIG. 6, hereinbelow. In FIG. 6, the elements analogous to those shown in FIG. 5 are given the same reference numerals, and will not be described here unless necessary. The scanning system of the third embodiment differs from that of the second embodiment in the form of the holder means.

The scanning system of this embodiment comprises a linear motor 21 as a drive means for driving the mobile body, a slider 22 which is linearly moved in the longitudinal direction of the linear motor 21, a rotating shaft 50 as a fixed portion which is fixed to the casing 20, an engagement means 52 which is brought into engagement with the rotating shaft 50 and a control means (not shown) which controls these elements, and the reading light source 31 is fixed to the slider 22 so that when the slider 22 is driven between an initial position (a waiting position on the side of one end of the linear motor 21) and an end portion (a waiting position on the side of the other end of the linear motor 21) by the linear motor 21, the reading light source 31 is moved substantially in parallel to the reading light scanning surface of the radiation image sensor 30 (up and down as seen in FIG. 6), thereby causing the reading light beam to scan the reading light scanning surface of the radiation image sensor 30.

In this particular embodiment, the slider 22, the reading light source 31 fixed to the slider 22, and a high frictional coefficient member 52e (to be described later) form the mobile body, and the rotating shaft 50 and the engagement means 52 form the holder means.

The engagement means 52 comprises a body portion 52a which is held for rotation by the rotating shaft 50 and is provided with a high frictional coefficient member 52d on one end, a solenoid 52b which moves said one end of the body portion 52a toward the slider 22 when energized, a spring 52c which urges the other end of the body portion 52a toward the slider 22 and the high frictional coefficient member 52e fixed to the slider 22. The rotating shaft 50 and the body portion 52a, the solenoid 52b, the spring 52c and the high frictional coefficient member 52d of the engagement means 52 are provided symmetrically on opposite end portions of the linear motor 21 so that the mobile body is braked when it is in one of the waiting positions.

The engagement portion 52 is arranged so that when the solenoid 52b is not energized, the body portion 52a rotates clockwise under the force of the spring 52c so that the high frictional coefficient member 52d on the body portion 52a is disengaged from the high frictional coefficient member 52e on the slider 22 to release the brake on the slider 22, whereas when the solenoid 52b is energized, the body portion 52a rotates counterclockwise so that the high frictional coefficient member 52d on the body portion 52a is engaged with the high frictional coefficient member 52e on the slider 22 to apply the brake on the slider 22.

Also in this embodiment a result similar to that as obtained in the second embodiment can be obtained and at the same time, since the high frictional coefficient members 52d and 52e both have a certain length, the slider need not be strictly positioned in the waiting position as compared with the second embodiment.

Though, in the first to third embodiments described above, the radiation image sensor structured as described above is used as the radiation image recording medium, the radiation image recording medium may be, for instance, a stimulable phosphor sheet using stimulable phosphors which store radiation energy upon projection of radiation and emit evanescent light upon projection of reading light. When the stimulable phosphor sheet is employed as the radiation image recording medium, the detecting means for detecting the evanescent light emitted from the stimulable phosphor sheet is also accommodated in the cassette.

What is claimed is:

1. A scanning system which causes a reading light beam to scan a radiation image recording medium which records a radiation image thereon upon exposure to radiation carrying thereon the radiation image and from which a signal is read out according to the radiation image upon exposure to the reading light beam, the scanning system comprising:

a mobile body provided with a light source which emits a line-like reading light beam;

a driver which linearly moves the mobile body in a direction perpendicular to the longitudinal direction of the reading light beam; and a holder which holds the mobile body in a waiting position so as to prevent movement in the direction perpendicular to the longitudinal direction of the reading light beam, wherein the holder comprises means for engaging the mobile body with a fixed portion to hold the mobile body in the waiting position and for reducing a load on the driver, and wherein the mobile body is in an inclined position to a horizontal.

2. A scanning system which causes a reading light beam to scan a radiation image recording medium which records a radiation image thereon upon exposure to radiation carrying thereon the radiation image and from which a signal is read out according to the radiation image upon exposure to the reading light beam, the scanning system comprising:

a mobile body provided with a light source which emits a line-like reading light beam;

a driver which linearly moves the mobile body in a direction perpendicular to the longitudinal direction of the reading light beam; and a holder which holds the mobile body in a waiting position so as to prevent movement in the direction perpendicular to the longitudinal direction of the reading light beam, wherein the driver comprises a linear motor, wherein the mobile body comprises a slider which is linearly moved in the longitudinal direction of the linear motor, wherein the holder comprises a shaft as a fixed portion which is fixed to a casing in parallel with the linear motor, and a brake unit which is fixed to the slider and is brought into engagement with the shaft and wherein the mobile body is in an inclined position to a horizontal.

3. The scanning system as defined in claim 2, wherein the brake unit comprises a body having a through-hole through which the shaft extends, a fixed engagement portion which is fixed to the body, a rotatable engagement portion, a solenoid which moves the rotatable engagement portion away from the shaft, and a spring which urges the rotatable engagement portion toward the shaft.

4. The scanning system of claim 2, wherein the waiting position includes at least two waiting positions.

5. A scanning system which causes a reading light beam to scan a radiation image recording medium which records a radiation image thereon upon exposure to radiation carrying thereon the radiation image and from which a signal is read out according to the radiation image upon exposure to the reading light beam, the scanning system comprising:

a mobile body provided with a light source which emits a line-like reading light beam;

a driver which linearly moves the mobile body in a direction perpendicular to the longitudinal direction of the reading light beam; and a holder which holds the mobile body in a waiting position so as to prevent movement in the direction perpendicular to the longitudinal direction of the reading light beam, wherein the holder comprises means for engaging the mobile body with a fixed portion to hold the mobile body in the waiting position and for reducing a load on the driver, and wherein the waiting position includes at least two waiting positions.

* * * * *